United States Patent
Archer, Jr. et al.

(10) Patent No.: US 7,680,254 B2
(45) Date of Patent: Mar. 16, 2010

(54) HEALTH MONITOR FOR A GEOGRAPHICALLY DISTRIBUTED VOICE MESSAGING SYSTEM

(75) Inventors: Shafford R. Archer, Jr., Norcross, GA (US); Jon S. Plotky, Lawrenceville, GA (US); Ian M. Moraes, Suwanee, GA (US); Philip L. Lowman, Ellijay, GA (US); James H. Spencer, Tucker, GA (US)

(73) Assignee: Glenayre Electronics, Inc., Duluth, GA (US)

( * ) Notice: Subject to any disclaimer, the term of this patent is extended or adjusted under 35 U.S.C. 154(b) by 841 days.

(21) Appl. No.: 11/170,532

(22) Filed: Jun. 29, 2005

(65) Prior Publication Data

US 2006/0239423 A1   Oct. 26, 2006

Related U.S. Application Data

(60) Provisional application No. 60/584,114, filed on Jun. 30, 2004.

(51) Int. Cl.
    *H04M 11/06* (2006.01)
(52) U.S. Cl. ............... 379/88.18; 379/29.01; 379/88.13; 379/88.26; 455/414.1
(58) Field of Classification Search ............... 379/1.02, 379/14.01, 26.01, 88.18, 9.03, 88.23, 114.03, 379/88, 18, 29.01, 88.13, 88.26; 463/16; 713/201; 709/245, 203, 206; 714/43; 455/414.1
See application file for complete search history.

(56) References Cited

U.S. PATENT DOCUMENTS

| | | | | |
|---|---|---|---|---|
| 5,633,909 A * | 5/1997 | Fitch | ............... | 379/29.01 |
| 5,737,395 A * | 4/1998 | Irribarren | ............... | 379/88.13 |
| 5,933,475 A * | 8/1999 | Coleman | ............... | 379/10.01 |
| 5,946,373 A * | 8/1999 | Harris | ............... | 379/14.01 |
| 5,982,858 A * | 11/1999 | Carter et al. | ............... | 379/88.26 |
| 6,330,305 B1 * | 12/2001 | Jones et al. | ............... | 379/14.01 |
| 6,445,774 B1 * | 9/2002 | Kidder et al. | ............... | 379/9.03 |
| 6,504,905 B1 * | 1/2003 | Tsai et al. | ............... | 379/26.01 |
| 6,675,325 B1 * | 1/2004 | Garney et al. | ............... | 714/43 |
| 6,810,111 B1 * | 10/2004 | Hunter et al. | ............... | 379/1.02 |
| 6,832,262 B2 * | 12/2004 | Cromer et al. | ............... | 709/245 |
| 6,909,776 B2 * | 6/2005 | Holt et al. | ............... | 379/88.26 |
| 6,950,497 B2 * | 9/2005 | Drury et al. | ............... | 379/14.01 |
| 6,961,410 B1 * | 11/2005 | Castagna | ............... | 379/88.23 |
| 7,136,461 B1 * | 11/2006 | Swingle et al. | ............... | 379/88.13 |
| 7,254,220 B1 * | 8/2007 | Reding et al. | ............... | 379/88.17 |
| 7,263,173 B2 * | 8/2007 | Cline et al. | ............... | 379/1.02 |
| 7,302,466 B1 * | 11/2007 | Satapathy et al. | ............... | 709/203 |
| 7,433,925 B1 * | 10/2008 | Shanker et al. | ............... | 709/206 |
| 2001/0019605 A1 * | 9/2001 | Rojas | ............... | 379/114.03 |

(Continued)

*Primary Examiner*—Gerald Gauthier
(74) *Attorney, Agent, or Firm*—Smith Frohwein Tempel Greenlee Blaha, LLC; Gregory Scott Smith

(57) ABSTRACT

A health monitor subsystem detects and responds to faults within a geographically disperse voice messaging system. The health monitor subsystem comprises agent, manager, interface, and common processes. The agent process monitors a respective voice messaging system component operative on the host. The manager process monitors and manages detected faults on the host. The interface process exposes a status responsive to the host. The common process monitors and manages a platform of hosts. The health monitor subsystem enables monitoring at the component, host, and platform levels.

19 Claims, 7 Drawing Sheets

U.S. PATENT DOCUMENTS

2005/0037741 A1 * 2/2005 Gilbert .................... 455/414.1
2005/0060577 A1 * 3/2005 Barrett et al. ............... 713/201
2005/0159203 A1 * 7/2005 Bond et al. .................. 463/16

* cited by examiner

HEALTH MONITOR FOR A GEOGRAPHICALLY DISTRIBUTED VOICE MESSAGING SYSTEM

CROSS-REFERENCE TO RELATED APPLICATIONS

This application claims priority to U.S. provisional application entitled, "Health Monitor Subsystem," filed on Jun. 30, 2004 and accorded application No. 60/584,114, which is incorporated by reference herein in its entirety.

This application is related to co-pending U.S. utility patent application entitled "Distributed IP Architecture For Telecommunications System," filed on Mar. 15, 2005 and accorded application Ser. No. 11/080,744, which is incorporated by reference herein in its entirety.

BACKGROUND OF THE INVENTION

1. Field of the Invention

Systems and methods that relate generally to voice messaging are invented and disclosed. More particularly, systems and methods for managing a system that communicates messages using a voice messaging architecture with geographically distributed components.

2. Related Art

Over the past several decades, voice mail has continued to expand and establish itself as a key element in the successful operations of most businesses. Some voice mail systems consist of components that communicate with each other on the client side of a public switched telephone network (PSTN) and thus, have been geographically co-located. This can be a great disadvantage for companies that have geographically dispersed offices.

In today's global economy, even small businesses may have a need for multiple offices for serving clients, interacting with vendors, or various other reasons. Presently available wide area networks including the Internet support email, video conferencing and other products that allow dispersed business sites appear more seamless and integrated. In addition, wired and wireless telephonic networks provide network-based voice mail services that are used by small business and personal consumers to communicate with others wherever they may be located. Other telecommunication products have been developed to provide voice mail service to small businesses, and other institutions such as schools, hospitals, government offices, and the like. These other telecommunication products generally include local voice message storage.

However, a significant problem that still exists for geographically dispersed offices is providing a telephonic system that operates as a single, co-located system while still serving the specialized needs of the various offices. Establishing a separate data storage facility at each office can be a costly endeavor as duplicative hardware must be purchased and maintained at each site. Furthermore, logistics for enabling inter-office voice mail access can become complex.

For example, it is difficult for an operator of a geographically disperse voice mail system to identify a source of a problem when the system fails to behave as intended. Because hardware components are geographically remote from each other, an operator may not be able to physically observe more than one hardware component at any time. In addition, an operator may not be cognizant of the actual architecture and operational readiness of the components of the voice mail system.

Accordingly, further improvements to geographically disperse voice mail systems are desired.

SUMMARY

An embodiment of a subsystem for monitoring the health of a voice messaging system comprises agent, manager, interface, and common processes. The agent process is configured to monitor a respective voice messaging system component operative on a host. The manager process is coupled to the agent process and configured to monitor and manage detected faults on the host. The interface process is coupled to the manager process and configured to expose a status associated with the host. The common process is coupled to the manager process and configured to monitor and manage a platform comprising a plurality of hosts.

Related methods of operation are also provided. An embodiment of a method for monitoring conditions across a geographically disperse voice message system comprises monitoring a first status condition responsive to a respective voice messaging system component operative on a host, monitoring a second status condition responsive to the operation of a respective host within the voice messaging system, monitoring a third status condition responsive to the operation of a respective platform, and providing a network accessible mechanism for discerning the operative health of one of the platform, the host, and the voice messaging system component.

Other features and advantages of the health monitor subsystem and methods for fault management across a geographically distributed messaging system will be or become apparent to one with skill in the art upon examination of the following figures and detailed description. All such additional features and advantages are within the scope of the health monitor subsystem and methods for fault management as protected by the accompanying claims.

BRIEF DESCRIPTION OF THE FIGURES

The health monitor subsystem and methods for fault management can be better understood with reference to the following figures. The components within the figures are not necessarily to scale, emphasis instead being placed upon clearly illustrating the principles of fault management across a geographically distributed messaging system. Moreover, in the figures, like reference numerals designate corresponding parts throughout the different views.

DETAILED DESCRIPTION

Figure 1:
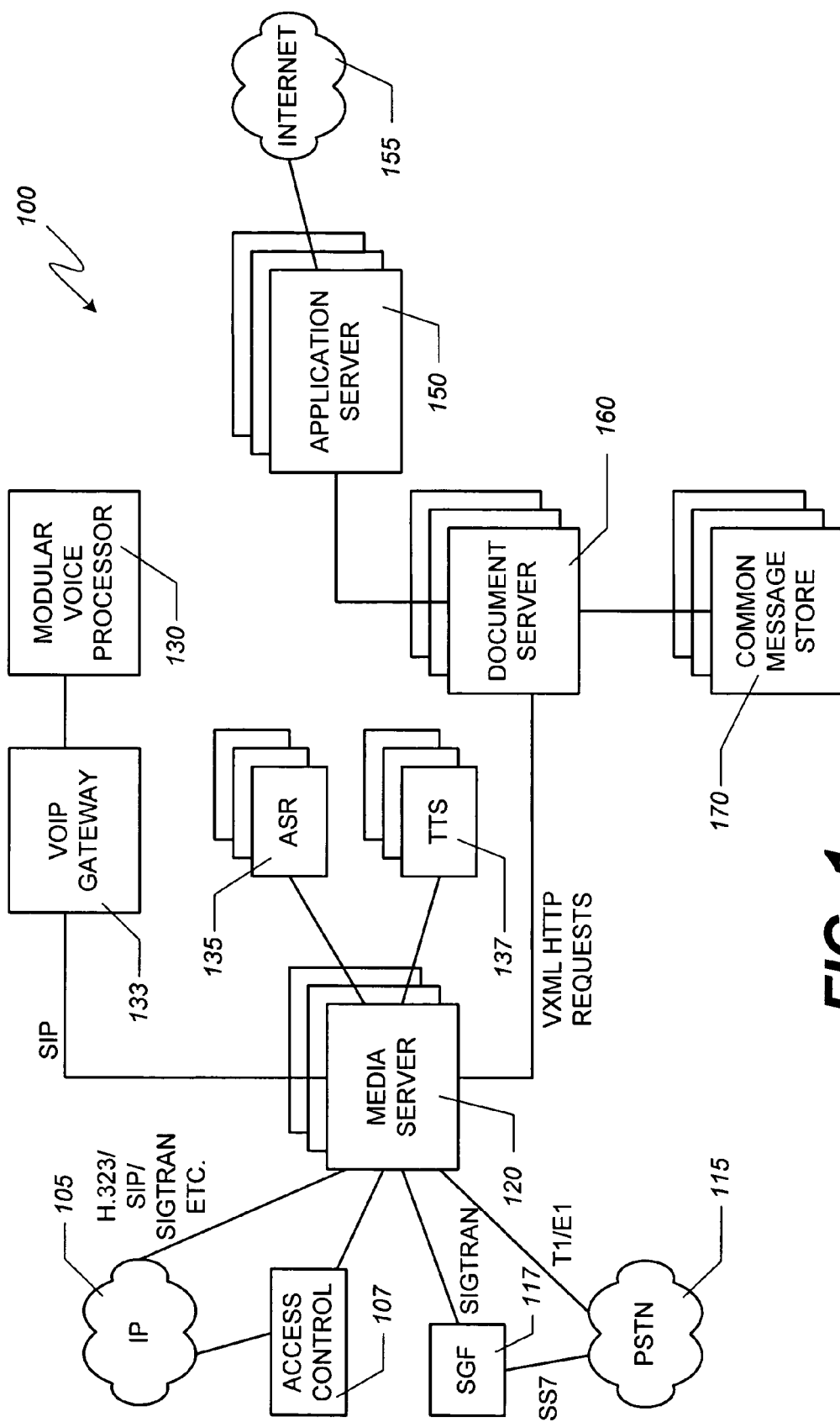
FIG. 1 is a block diagram illustrating an embodiment of a geographically distributed messaging system.

Various embodiments of systems, methods, computer programs, communications platforms, etc. that monitor status and respond to system faults will be described with respect to FIGS. 1-7. As an introductory matter, however, an exemplary embodiment of a distributed telecommunications system with a health monitoring subsystem will be briefly described.

A distributed telecommunications system provides functionality to support modern small or large office business settings, such as call forwarding, auto-attendant, voice mail, voice messaging, etc. The telecommunications system is made up of hardware devices that can be located in various locations that are remote from each other. Each hardware device is coupled to an Internet protocol (IP) based wide-area network. The system provides message storage assurance to subscribers and enables a caller to generate a message and terminate the communication with a voice recorder without having to wait on-the-line for a confirmation that the voice message was successfully delivered and stored. The system also provides message durability in that once the voice message is recorded; the system ensures that despite device and network service outages, the voice message is saved in the common message store.

The distributed telecommunication system is configured with a health monitor subsystem configured to detect and contain faults throughout the voice message system and restore service to users of the system. The health monitor subsystem supports fault management for dependent third-party processes operative within the system. The health monitor subsystem provides a mechanism for monitoring a set of message handling components on a voice message system host. In addition to providing real time information regarding the operative status of hardware and software components on the host, the health monitor subsystem identifies and restarts a component that has failed.

The health monitor subsystem comprises a manager process on each host and an agent process for a component process operative on the host. The health monitor subsystem is flexible in that agent processes can be associated with component processes as desired. For example, an agent process can be associated with a component process that implements an important function of the voice messaging system. Alternatively, agent processes can be associated with additional and less important component processes operative on the host computing device.

The health monitor subsystem can be configured to interface with a hardware mechanism for restarting the host. Conversely, software is used to restart failed component processes on the host.

The health monitor subsystem further comprises an interface process and a common process. The interface process resides on a host and communicates with the manager process to report the overall host status to one or more destinations external to the host. The common process monitors and reports status regarding each of the manager processes operative within a platform. The common process communicates with one or more manager processes on each of the hosts forming the platform.

Each of the manager, agent, interface, and common processes are designed to be configurable. Configuration parameters include service check timeouts, maximum concurrent service checks, status log names, log file locations, etc.

While there is a centralized manager process resident on each host, the mechanisms for monitoring status information including hardware and component process faults are distributed. Information regarding a component, such as when it is operational or when there is a failure condition and dependencies between component processes and component sub-processes is distributed. Consequently, the health monitor system does not need a centralized rule base that has to be updated each time a dependency between component processes changes on a host.

The health monitor subsystem design is extensible and enables incremental development as features or voice message system requirements are added or modified. For example, in an initial release the monitoring performed by agent processes can be focused on critical processes. Furthermore, initial monitoring can be broad and coarse. In future releases, as operational aspects of the voice messaging system are better understood, the manager and agent processes can be fine tuned to provide more accurate and finer-grained monitoring of hardware devices, component processes, and component sub-processes.

With regard to all described embodiments, it should be appreciated that network communications between remote computing devices are not limited to any particular protocol, transmission medium, communications network, topology, architecture, etc. Furthermore, it should be appreciated that the voice messaging system, the health monitor subsystem, and any associated services and functions need not be provided over a public network but, rather, may also be provided over a private network, such as a local area network, wide area network, etc., to name a few examples.

The health monitor subsystem comprises a hierarchical relationship between various functional elements within a distributed voice messaging system. These elements include hosts or hardware devices, platforms, processes, components, and sub-processes. Each of the various elements is associated with a specific level in the described hierarchy. In the described embodiments, a host is a computing device coupled to a network; a platform is a plurality of hosts; a process is the combination of a computer program and data; a sub-process is the combination of a computer program and data that is dependent on a particular process; a component is a binary object or computer program that performs a specific function and is designed to operate with other components and applications.

Having generally described an exemplary health monitor subsystem that is operative across a distributed voice messaging system, various additional embodiments will be described with respect to FIGS. 1-7. FIG. 1 illustrates an embodiment of a geographically distributed messaging system 100 comprising a media server 120, document server 160, and a common message store 170 that provides for message storage assurance and durability of voice messages. Media server 120 couples the distributed messaging system 100 to one or more networks. Document server 160, located remotely from the media server 120, manages the storage of voice messages in common message store 170. The complexities of interfacing to telecommunications networks such as the public switched telephone network (PSTN) 115 are handled through a signaling gateway function (SGF) 117 coupled between media server 120 and PSTN 115. The SigTran protocol is used in the link between media server 120 and SGF 117 and signaling system 7 (SS7) protocol is used to perform out-of-band signaling in support of call-establishment, billing, routing, and information-exchange functions between SGF 117 and PSTN 115. As illustrated in FIG. 1, media server 120 is also coupled to PSTN 115 via T1/E1 or other multiple channel links.

A voice over IP (VoIP) gateway 133 integrates the media server 120 with a modular voice processor 130 or other devices that use session initiation protocol (SIP). Access control 107 manages the complexities of integrating multiple media servers 120 with Internet protocol (IP) network 105. When a single media server 120 is used, a communication link using SIP, SigTran, or the H.323 messaging protocols couples media server 120 to IP network 105. One or more automatic-speech recognition (ASR) modules 135 and one or more text-to-speech (TTS) conversion modules are coupled to media server 120 to enable both audio and text input and output to/from distributed messaging system 100. VoIP gateway 133 integrates the media server 120 with a modular voice processor 130 or other devices that use session initiation protocol (SIP). A simplified protocol is used for communications between the remaining components of the distributed messaging system.

Voice extensible markup language (VoiceXML or VXML) is one mode of communication between media server 120 and remotely located document server 160. VXML, which uses hypertext transfer protocol (HTTP) to communicate information in packets, allows a user to interact with devices coupled to IP networks using voice-recognition technology. Instead of a traditional graphical user interface based browser that relies on a keyboard and a mouse, VXML relies on a voice browser and/or any of a plethora of voice-based devices such as telephones, mobile phones and combination devices. Using VXML, the user interacts by listening to audio output that is either pre-recorded or synthesized and submits input through the user's natural speaking voice or a touch-tone keypad. VXML is designed for creating audio dialogs that feature synthesized speech, digitized audio, and recognition of spoken and dual-tone multiple frequency encoded inputs, recording of voice messages, and mixed conversations. As will be explained in further detail below, VXML HTTP requests are communicated from media server 120 to document server 160, which manages the storage, confirmation, and retrieval of voice messages saved in common message store 170.

Application server 150, coupled to document server 160 and Internet 155, provides a mechanism for subscribers of the distributed messaging system and third-parties with proper access privileges to access previously stored voice messages from common message store 170.

Messages are durable when once a subscriber records a message in a VXML session, the message is saved and accessible via a common message store remotely located from the subscriber despite media server 120 failures, document server 160 failures and wide area network service outages. This is accomplished because message storage from a local data store to the remotely located common message store can be asynchronous. That is, the subscribing caller does not need to wait on-the-line for acknowledgement of a successful transfer of the message. Because the common message store comprises an array of disks, the messages and metadata stored therein can survive numerous device failures and request restarts for transfers of message blocks.

Figure 2:
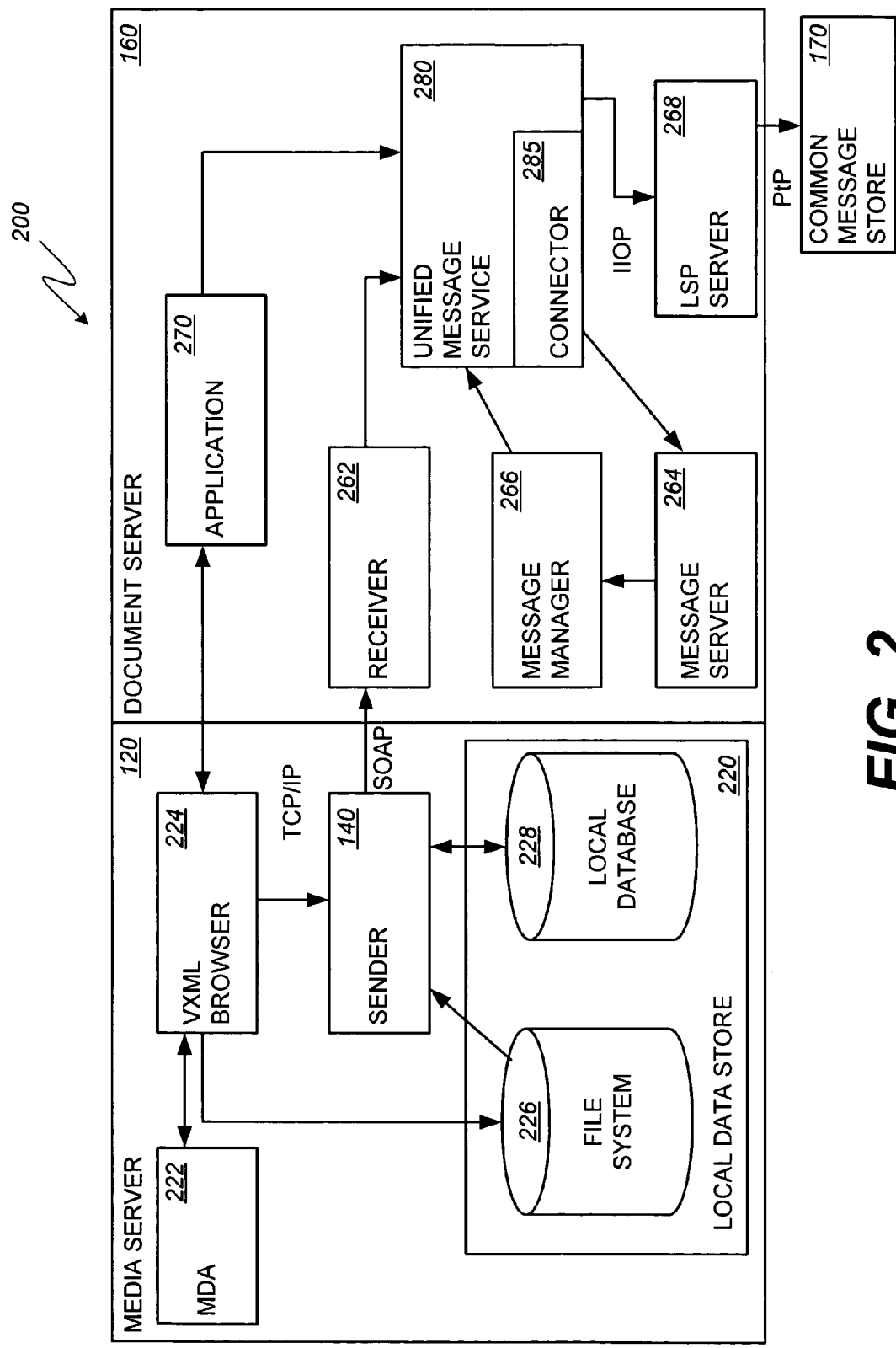
FIG. 2 is a block diagram illustrating an embodiment of a message durability subsystem that can be implemented within the distributed messaging system of FIG. 1.

FIG. 2 is a functional block diagram illustrating an embodiment of a message durability subsystem 200 that can be implemented within the distributed messaging system 100 of FIG. 1. The message durability subsystem 200 comprises media server 120, document server 160, and common message store 170. Media server 120 comprises a message deposit application 222 coupled to VXML browser 224. Message deposit application 222 prepares and controls the media server 120 to enable message recording. VXML browser 224 is further coupled to sender 140 and local data store 220. VXML browser 224 communicates with sender 140 via TCP/IP. Local data store 220 comprises file system 226, which provides a filename and path to associate with the actual voice data and database 228, which saves and associates metadata with a recorded voice message.

Sender 140 communicates requests to document server 160 via simple object access protocol (SOAP). Sender 140 provides a socket connection for VXML browser 224. The socket connection can be accessed by multiple languages using multiple computing platforms. Request information transferred to the document server 160 includes attachment file path and name, message type identifier, message status identifier, time for delivery, originator identifier, and identifiers for one or more recipients. Sender 140 is configured to save the request including message request delivery state information into local data store 220, send message header information (metadata) together with the attachment file to the document server 160, delete the request and delivery information when the message has been successfully delivered to the document server 160, and retry delivery for messages that are not successfully delivered.

Document server 160 comprises receiver 262, message server 264, message manager 266, unified message service 280, layered service provider server 268, and application 270. Receiver 262 is configured to receive the SOAP requests from sender 140, retrieve the message information and attachments, invoke the unified message service to create a Java message service message and save the created message in message server 264 persistently. Receiver 262 is further configured to handle SOAP fault reporting when data transfer errors occur. Unified message service 280 communicates with message server 264 via connector 285. Message server 264 provides persistent storage to the message and related data on the document server 160, asynchronous message delivery, ensures once-and-only-once delivery of the message to the common message store 170, and deletes the message when the message has been successfully stored in the common message store 170. Message manager 266 gets messages from the message server 264, then forwards them to the common message store 170 using the link provided by the unified message service application interface and the layered service provider server 268. Message manager 266 is configured to status the message server 264 regarding whether the message was successfully delivered to the common message store 170. Message manager 266 is further configured to retry message delivery for messages that were not successfully uploaded and integrated with the common message store 170.

Application server 270, interposed between unified message service 280 and VXML browser 224, exposes previously stored messages to one or more subscribers communicatively coupled to media server 120.

To ensure message storage and durability using the above-described message durability subsystem 200, the various servers and processes implemented therein may be integrated with a health monitor subsystem. As described generally above, the health monitor subsystem comprises a set of distributed processes configured to collect and respond to operative status at various hierarchical levels across the voice messaging system.

Figure 3:
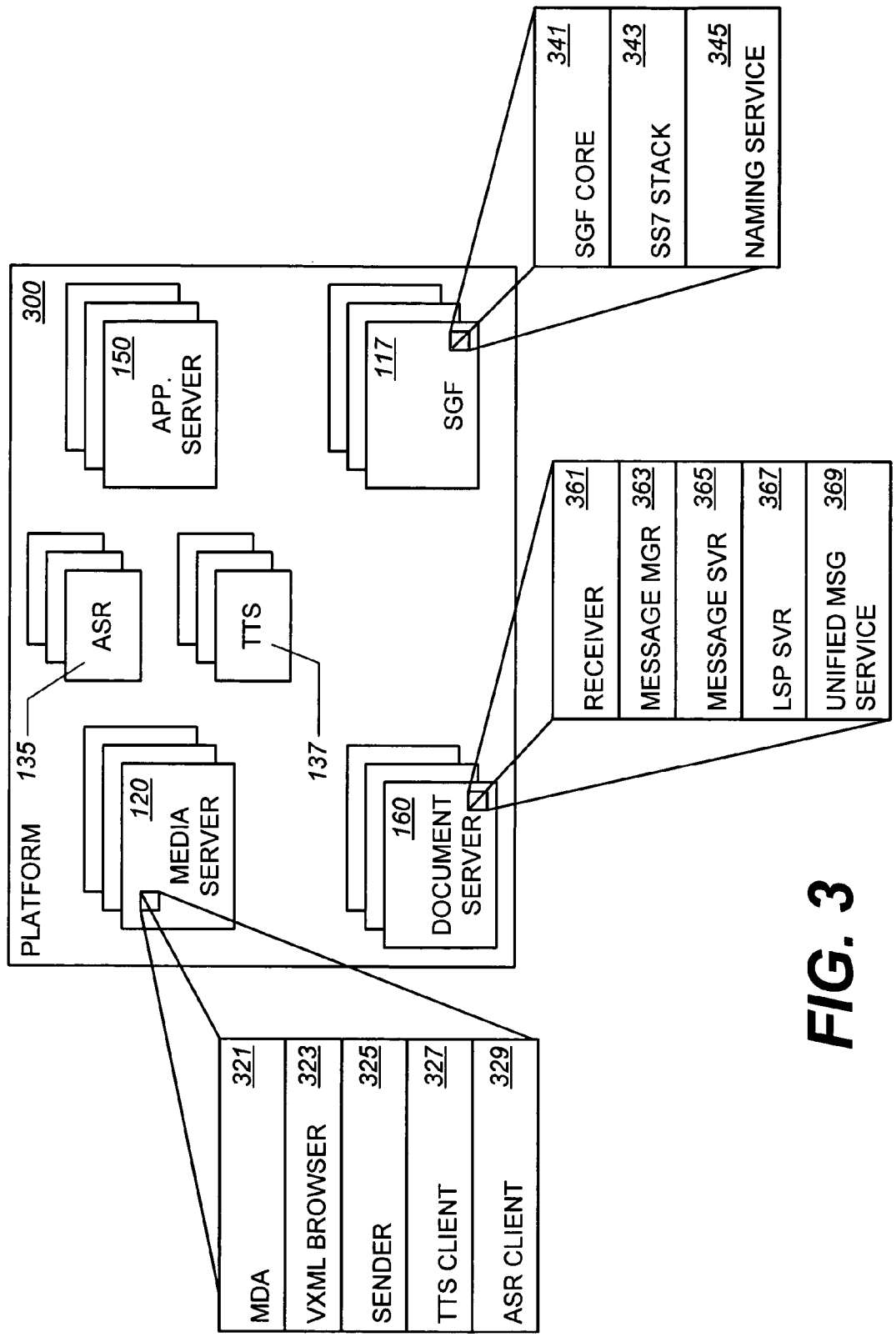
FIG. 3 is a block diagram illustrating an embodiment of the hierarchical relationship between various call handling components throughout the message durability subsystem of FIG. 2.

FIG. 3 is a block diagram illustrating an embodiment of the hierarchical relationship between various call handling components throughout the message durability subsystem of FIG. 2. As indicated in FIG. 3, platform 300 is a collection of hosts implementing media servers 120, application servers 150, document servers 160, and SGF servers 117. Platform 300 further includes one or more ASR modules 135 and one or more TTS conversion modules. Media server 120 comprises MDA 321, VXML browser 323, sender 325, TTS client 327, and ASR client 329 components that are important to various aspects of the distributed voice messaging system associated with media server 120. Accordingly, each of these media server components can be associated with a respective agent process to monitor and manage the health of the corresponding component. In addition, SGF server 117 comprises SGF core 341, SS7 stack 343, and naming service 345 components that are important to various aspects of the SGF server 117. Each of these SGF server components can be associated with a respective agent process to monitor and manage the health of the corresponding component. Similarly, document server 160 comprises receiver 361, message manager 363, message server 365, LSP server 367, and unified message service 369 components that are important to various aspects of the distributed voice messaging system associated with document server 160. Thus, each of these document server components can be associated with a respective agent process to monitor and manage the health of the corresponding component. Accordingly, FIG. 3 illustrates the hierarchical nature between platform 300, hosts (i.e., media server 120, application server 150, document server 160, SGF server 117, etc.), and components.

Figure 4:
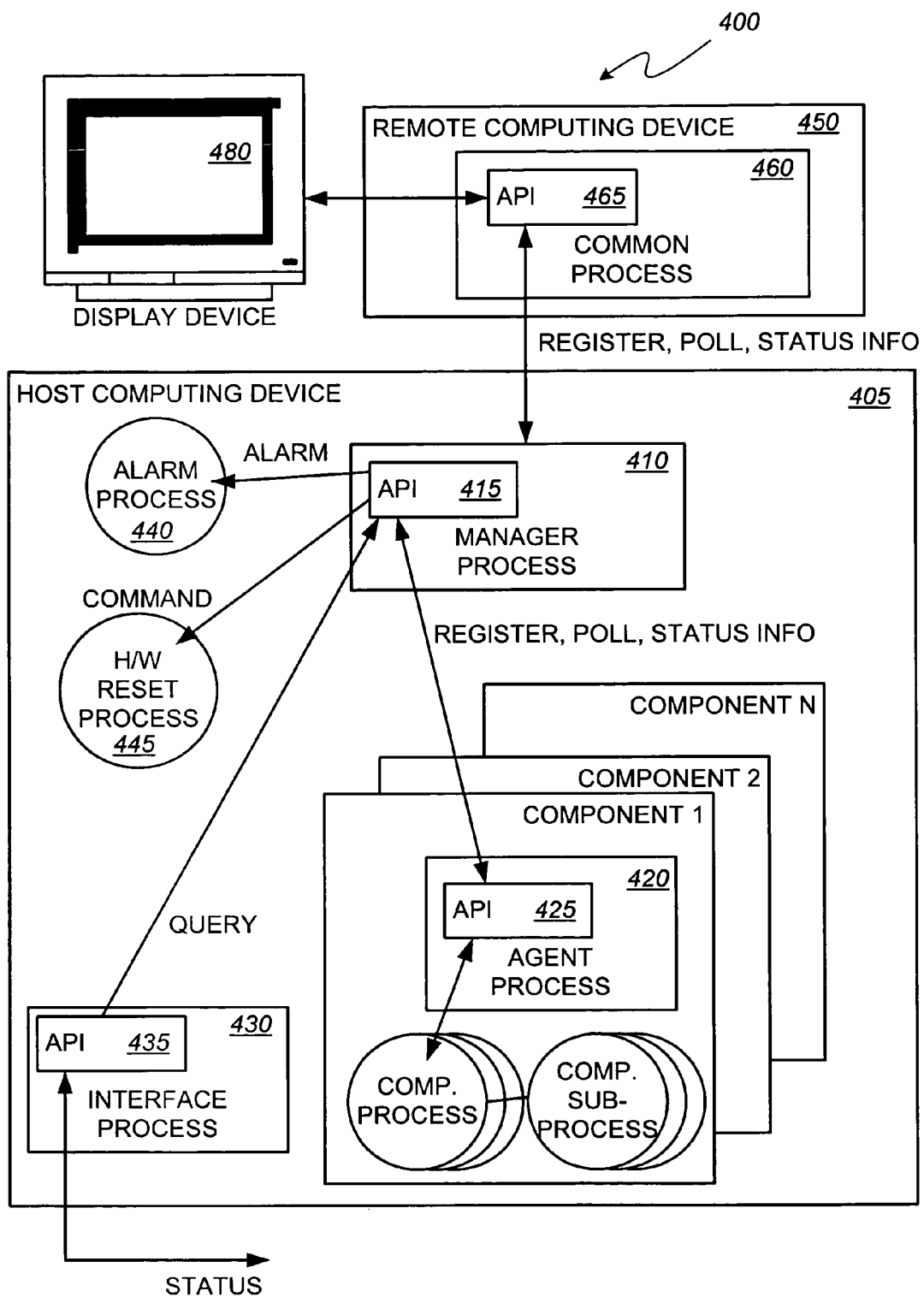
FIG. 4 is a schematic diagram illustrating an embodiment of a health monitor subsystem that can be integrated within the various hosts and components of the platform of FIG. 3.

FIG. 4 is a schematic diagram illustrating an embodiment of a health monitor subsystem 400 that can be integrated within the various hosts and components of the platform of FIG. 3. Health monitor subsystem 400 comprises manager process 410, agent process 420, interface process 430, and common process 460. In the illustrated embodiment, manager process 410 and interface process 430 are operative on host computing device 405 along with additional alarm process 440 and hardware reset process 445. Common process 460 is operative on a remote computing device 450 communicatively coupled to host computing device 405. Remote computing device 450 is further coupled to display device 480.

The health monitor subsystem 400 is not limited to this arrangement. For example, one or more of the manager process 410, interface process 430, alarm process 440, and hardware reset process 445 may be implemented on devices external to host computing device 405.

Regardless of the actual location of the manager, interface, and alarm processes, agent process 420 is implemented within an operative component on host computing device 405. Agent process 420 is responsible for monitoring and restarting the associated component including component processes and dependent component sub-processes operative within the component. The associated component may or may not be critical to the operation of the underlying voice messaging system. Agent process 420 registers or unregisters with the manager process 410, sends status information to the manager process 410, including notifying the manager process 410 when the associated component fails. In addition, agent process 420 receives requests to restart the component, provide component status information, and to shutdown the associated component.

Agent process 420 uses application programming interface 425 to register/unregister with and communicate status to manager process 410. As indicated in FIG. 4, the communication link between manager process 410 and agent process 420 is a two-way link. In a preferred embodiment, agent process 420 forwards status information regarding the associated component periodically to manager process 410. Alternatively, manager process 410 could be configured to poll or otherwise request each agent process 420 to return status information. The manager process 410 could be configured to periodically or aperiodically request such status replies.

Manager process 410 is responsible for the overall health of the host computing device 405. Manager process 410 receives requests from each agent process 420 to register and unregister. In addition, manager process 410 receives error notices and other status information from agent process 420, receives requests from common process 460 to shutdown host computing device 405. Manager process 410 forwards alarm conditions to alarm process 440 and one or more commands to hardware reset process 445. Furthermore, manager process 410 registers and unregisters with, sends periodic status messages, including error messages, to common process 460. Moreover, common process 460 forwards requests to manager process 410 to restart host computing device 405 and to provide host status information.

Manager process 410 uses application programming interface 415 to register/unregister with and communicate status to common process 460. As indicated in FIG. 4, the communication link between manager process 410 and common process 460 is a two-way link. In a preferred embodiment, manager process 410 forwards status information regarding the associated host periodically to common process 460. Alternatively, common process 460 could be configured to poll or otherwise request each manager process 410 to return status information. Common process 460 could be configured to periodically or aperiodically request such status replies.

Common process 460 uses application programming interface 465 to communicate status to display device 480 and to communicate requests and receive status information from manager process 410 via application programming interface 415. Display device 480 may include a graphics processor and associated applications for controllably rendering status from one or more components and or from one or more hosts coupled to common process 460.

Interface process 430 provides a mechanism for system administrators or other software components to retrieve status information concerning the host computing device 405 and the various components implemented therein. While the functionality provided by interface process 430 could be combined with the functionality provided by the manager process 410, the interface process 430 is defined separately to reduce the load and complexity of the manager process 410. Interface process 430 uses application programming interface 435 to communicate requests for and receive status information from manager process 410. As indicated in FIG. 4, the communication link between manager process 410 and interface process 430 is a two-way link. Interface process 430 is configured to communicate with a wide area network based user interface that permits system administrators to observe the health of various platforms, hosts, components, processes, and sub-processes.

In operation, a subscriber of voice services initiates a call with a telephonic device coupled to distributed voice messaging system 100. Message deposit application 222, operable within media server 120, generates a new filename for the message about to be recorded and collects or otherwise generates metadata in accordance with one or more identifiers used to classify or otherwise describe the nature of the call, subscriber, and the voice message.

The message deposit application 222 addresses the VXML browser 224, sender 140, file system 226, and local data store 228 to ensure the media server 120 is prepared to record the voice message. If any of these devices reports a non-ready condition to the message deposit application 222, the message deposit application 222 immediately informs the subscriber 405 that a system failure has occurred that the message cannot be recorded and aborts the recording process. Assuming that these devices have been configured with agent process 420, health monitor subsystem 400 will detect, diagnose, isolate, and attempt to repair the voice messaging system 100.

Figure 5:
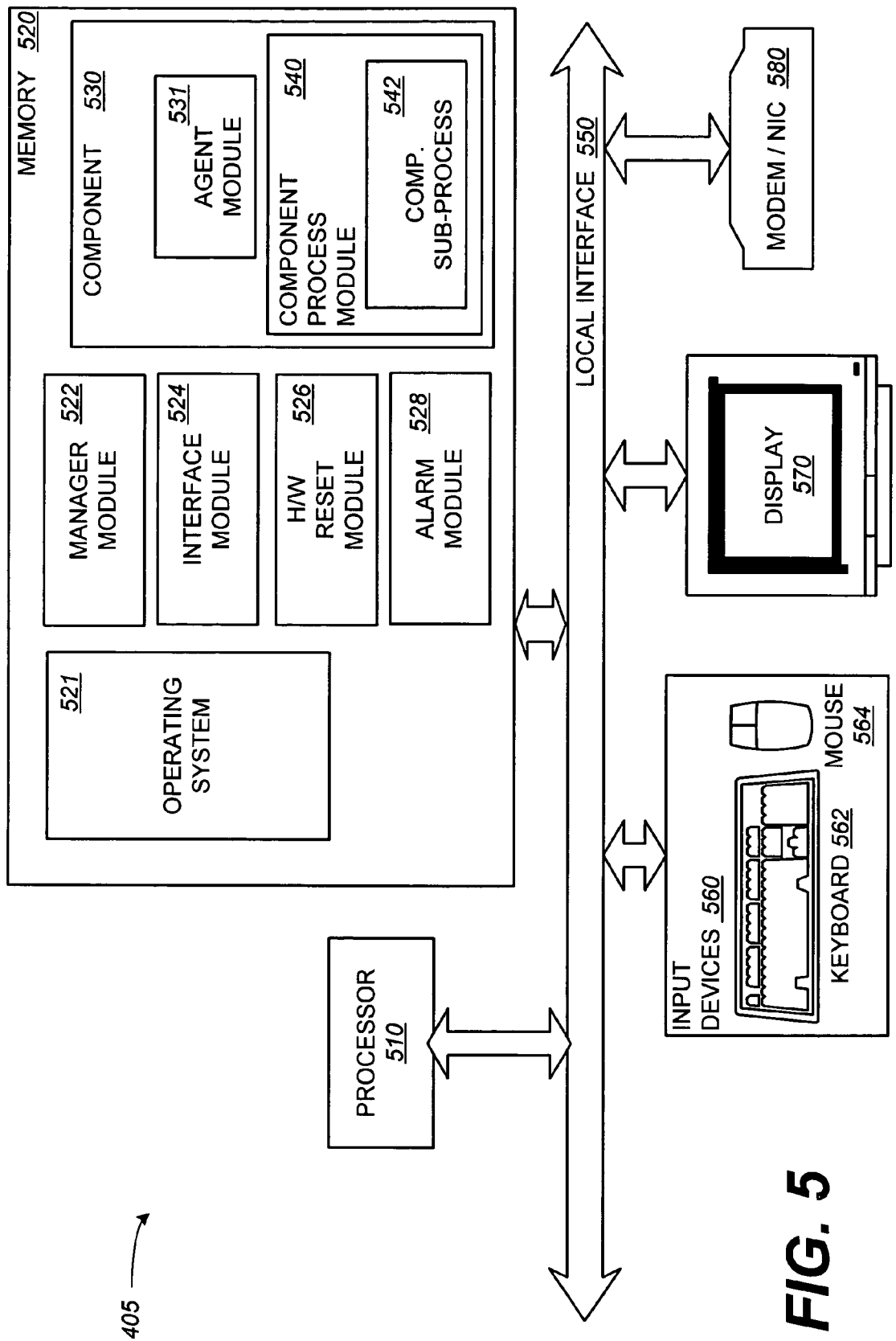
FIG. 5 is a schematic diagram illustrating an embodiment of a computing device configured to implement a host within the health monitor subsystem of FIG. 4.

Reference is now directed to FIG. 5, which illustrates a functional block diagram of the host computing device 405 of FIG. 4. Generally, in terms of hardware architecture, as shown in FIG. 5, the host computing device 405 may include a processor 510, memory 520, input devices 560, display 570, and modem/network interface 580 that are communicatively coupled via local interface 550.

Local interface 550 can be, for example but not limited to, one or more buses or other wired or wireless connections, as is known in the art or may be later developed. Local interface 550 may have additional elements, which are omitted for simplicity, such as controllers, buffers (caches), drivers, repeaters, and receivers, to enable communications. Further, local interface 550 may include address, control, and/or data connections to enable appropriate communications among the aforementioned components of the host computing device 405.

In the embodiment of FIG. 5, the processor 510 is a hardware device for executing software that can be stored in memory 520. The processor 510 can be any custom-made or commercially-available processor, a central-processing unit (CPU) or an auxiliary processor among several processors associated with the host computing device 405 and a semiconductor-based microprocessor (in the form of a microchip) or a macroprocessor.

The memory 520 can include any one or combination of volatile memory elements (e.g., random-access memory (RAM, such as dynamic-RAM or DRAM, static-RAM or SRAM, etc.)) and nonvolatile-memory elements (e.g., read-only memory (ROM), hard drives, tape drives, compact-disk drives (CD-ROMs), etc.). Moreover, the memory 520 may incorporate electronic, magnetic, optical, and/or other types of storage media now known or later developed. Note that the memory 520 can have a distributed architecture, where various components are situated remote from one another, but accessible by processor 510.

The software in memory 520 may include one or more separate programs, each of which comprises an ordered listing of executable instructions for implementing logical functions. In the example of FIG. 5, the software in the memory 520 includes manager module 522, interface module 524 H/W reset module 526, alarm module 528 and component 530 that function as a result of and in accordance with operating system 521. The operating system 521 preferably controls the execution of computer programs, such as manager module 522 and provides scheduling, input-output control, file and data management, memory management, and communication control and related services.

In an embodiment, each of the manager module 522, interface module 524 H/W reset module 526, alarm module 528 and component 530 is one or more source programs, executable programs (object code), scripts, or other collections each comprising a set of instructions to be performed. It will be well understood by one skilled in the art, after having become familiar with the teachings of the system and method, that various components and modules may be written in a number of programming languages now known or later developed.

The input devices 560 may include, but are not limited to, a keyboard 562, a mouse 564, or other interactive-pointing devices, voice-activated interfaces, or other operator-machine interfaces (omitted for simplicity of illustration) now known or later developed. The input devices 560 can also take the form of data-file transfer device (e.g., floppy-disk drive 30). Each of the various input devices 560 may be in communication with the processor 510 and/or the memory 520 via the local interface 550.

Display device 570 may be coupled to a video interface that supplies a video-output signal to render desired data. Display devices that can be associated with the host computing device 405 are conventional CRT based displays, liquid-crystal displays (LCDs), plasma displays, image projectors, or other display types now known or later developed. It should be understood, that various output device(s) (not shown) may also be integrated via local interface 550 and/or via modem/NIC 580 to other well-known devices such as plotters, printers, copiers, etc.

Local interface 550 may also be in communication with input/output devices that communicatively couple the host computing device 405 to one or more TCP/IP-based networks (FIG. 1). These two-way communication devices include, but are not limited to, modulators/demodulators (modems), network-interface cards (NICs), radio frequency (RF) or other transceivers, telephonic interfaces, bridges, and routers. For simplicity of illustration, such two-way communication devices are represented by modem/NIC 580.

When the host computing device 405 is in operation, the processor 510 is configured to execute software stored within the memory 520, to communicate data to and from the memory 520, and to generally control operations of the host computing device 405 pursuant to the software. The various modules, such as manager module 522, interface module 524, H/W reset module 526, alarm module 528, and agent module 531, component 530, component process module 540, and component sub-process 542 and the operating system 521, in whole or in part, but typically the latter, are read by the processor 510, perhaps buffered within the processor 510, and then executed.

Figure 6:
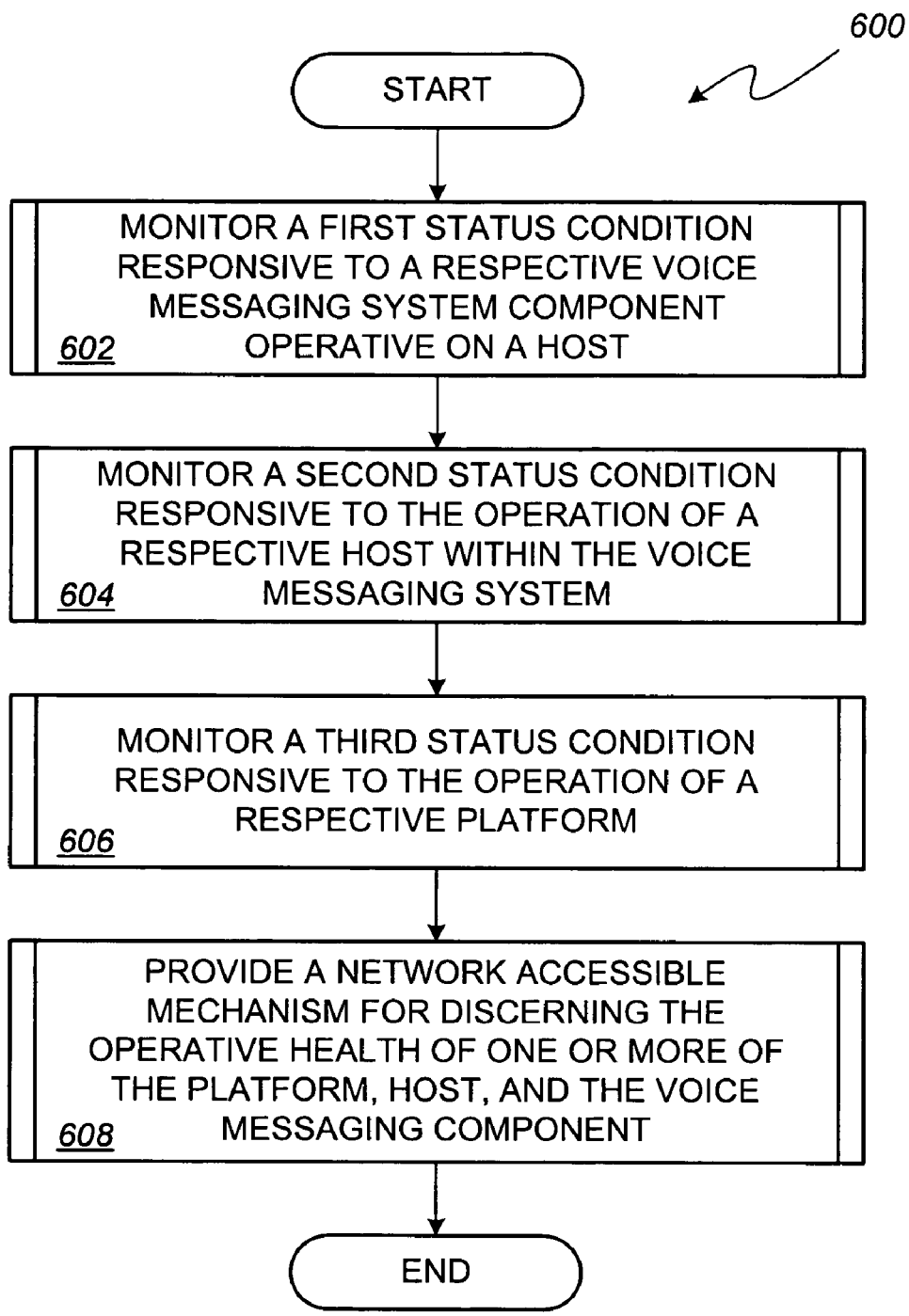
FIG. 6 is a flow diagram illustrating an embodiment of a method for monitoring conditions across the geographically disperse voice message system that can be implemented by the health monitor subsystem of FIG. 4.

FIG. 6 is a flow diagram illustrating an embodiment of a method 600 for monitoring conditions across the geographically disperse voice message system that can be implemented by the health monitor subsystem of FIG. 4. Method 600 begins with block 602 where a health monitor subsystem monitors a status condition of a voice messaging system component. As indicated in block 604, the subsystem monitors a status condition associated with a particular host in the voice messaging subsystem. As shown in block 606, the health monitor subsystem monitors a status condition associated with a particular platform in the distributed voice messaging system.

It should be understood that the functions described in association with blocks 602-606 above could be performed substantially simultaneously or in any other order in addition to the illustrated flow embodiment. After one of the functions associated with blocks 602-606 have been performed, the health monitor subsystem provides a network accessible mechanism for discerning or otherwise observing the operative health of one or more of the platform, host, and the voice messaging component, as indicated in block 608.

When the voice messaging system 100 comprises a plurality of platforms, hosts, and voice messaging system components, the mechanism for discerning the operative health may be configured to enable selective observation of operational status of the voice messaging system. For example, operational status associated with system components critical for enabling one or more functions across the distributed voice messaging system can be displayed together. Other example arrangements for reporting operational status may include a designated display for fault or alarm conditions, one or more displays for observing media servers, document servers, and SGF hosts as a group of similarly configured hosts, etc.

Figure 7:
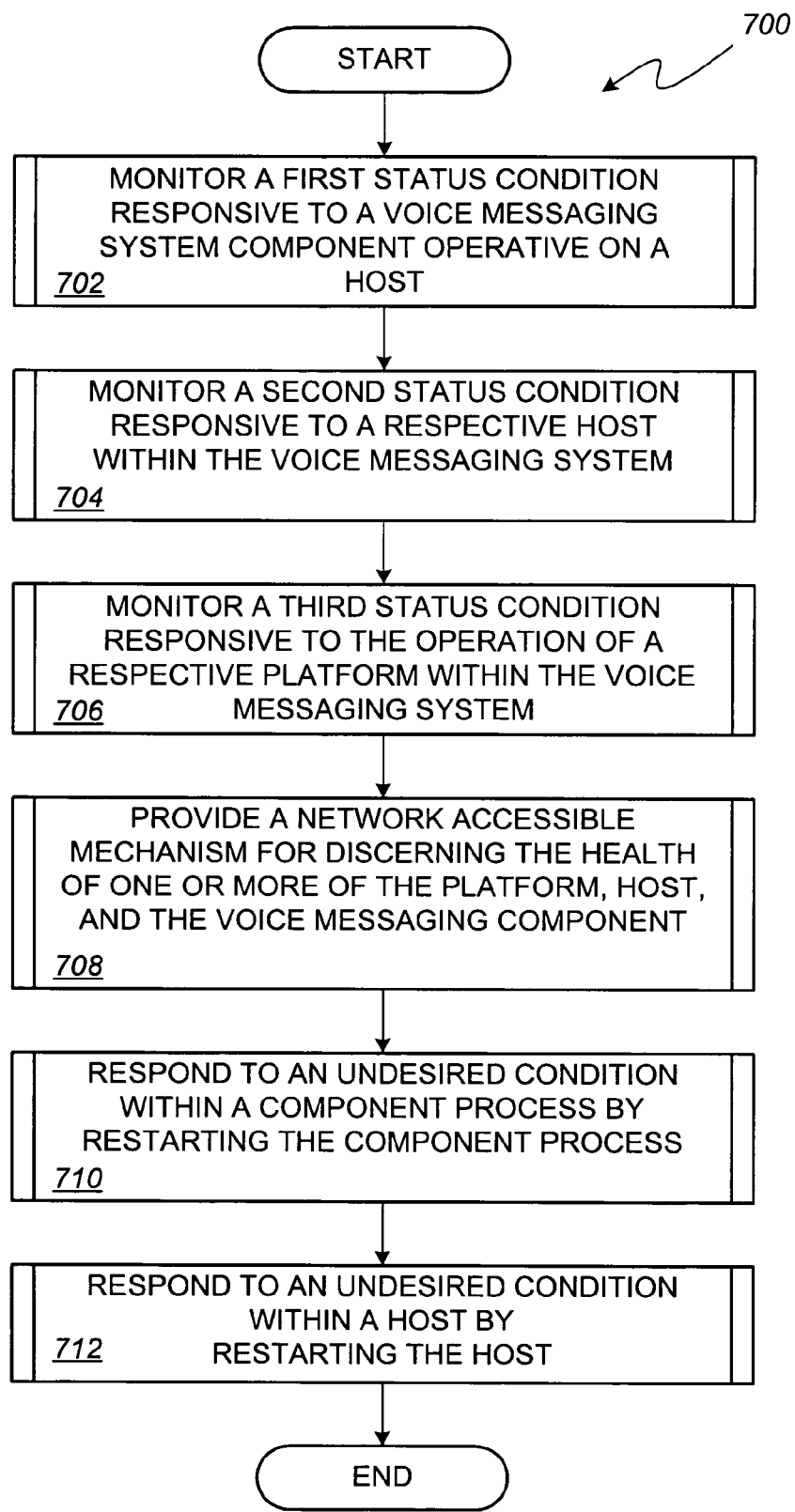
FIG. 7 is a flow diagram illustrating an embodiment of a method for monitoring and recovering from fault conditions across the geographically disperse voice message system that can be implemented by the health monitor subsystem of FIG. 4.

FIG. 7 is a flow diagram illustrating an embodiment of a method for monitoring and recovering from fault conditions across the geographically disperse voice message system that can be implemented by the health monitor subsystem of FIG. 4. The method 700 for monitoring and recovering from fault conditions begins with block 702 where the health monitor subsystem monitors a first status condition responsive to a voice messaging system component operative on a host. In block 704, the health monitor subsystem monitors a second status condition responsive to a respective host within the voice messaging subsystem. In block 706, health monitor subsystem monitors a third status condition responsive to the operation of a respective platform within the voice messaging system.

It should be understood that the functions described in association with blocks 702-706 above could be performed substantially simultaneously or in any other order in addition to the illustrated flow embodiment. After one of the functions associated with blocks 702-706 have been performed, the health monitor subsystem provides a network accessible mechanism for discerning the health of one or more of the platform, host, and the voice messaging component, as indicated in block 708.

Thereafter, as shown in block 710, health monitor subsystem responds to an undesired condition within a component process by restarting the component process. An undesired condition may be indicated by a failure to respond to a request for information (i.e., a polling event) or the return of present status information that is outside an expected range. Restarting may include manipulation of various data items used in the component process. In block 712, health monitor subsystem responds to an undesired condition within a host by restarting the host. Restarting the host may include suspending various processes throughout the health monitor subsystem or the distributed voice messaging system until the host reaches a desired operating state. Restarting the host may also include manipulation of various default values used during a system initialization or the retrieval and use of values recorded from associated processes before they were suspended.

The flow diagrams of FIGS. 6 and 7 show the architecture, functionality, and operation of a possible implementation via software and or firmware associated with a host of communicatively coupled hardware devices and component processes and sub-processes implemented therein that monitor and respond to fault conditions across a geographically distributed voice messaging system. In this regard, each block represents a module, segment, or portion of code, which comprises one or more executable instructions for implementing the specified logical function(s).

The operational software programs that may be used by the various hosts of the distributed messaging system 100, as well as operational software that may be used in conjunction with the health monitor subsystem 400, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

While various embodiments of the systems and methods for monitoring and responding to fault conditions in a distributed voice messaging system have been described many more embodiments and implementations are possible that are within the scope of the accompanying claims. Accordingly, the health monitor subsystem and methods for fault management are not to be restricted beyond the attached claims and their equivalents.

What is claimed is:

1. A health monitor subsystem configured to detect and respond to faults within a geographically disperse voice messaging system, the subsystem comprising:
    an agent process configured to monitor an associated voice messaging system component that is operative on a host within the voice messaging system;
    a manager process coupled to the agent process and configured to monitor and manage detected faults on the host within the voice messaging system, wherein the manager process is adapted to forward a command to a hardware reset process, the hardware reset process configured to temporarily remove power to the host prior to restarting the host;
    an interface process coupled to the manager process and configured to expose a status associated with the host within the voice messaging system; and
    a common process coupled to the manager process and configured to monitor and manage a platform comprising a plurality of hosts that are within the voice messaging system.

2. The health monitor subsystem of claim 1, wherein the agent process is further configured to restart the respective voice messaging system component.

3. The health monitor subsystem of claim 1, wherein the agent process is further configured to register with and send periodic messages that include status information to the manager process.

4. The health monitor subsystem of claim 1, wherein the agent process is configured to receive a manager process request.

5. The health monitor subsystem of claim 1, wherein the manager process communicates with a hardware mechanism to restart the host.

6. The health monitor subsystem of claim 1, wherein the manager process communicates alarm conditions.

7. The health monitor subsystem of claim 1, wherein the manager process comprises dependencies among components operative on the host.

8. The health monitor subsystem of claim 1, wherein an application programming interface is integrated with one of the agent, manager, interface, and common processes, the application programming interface configured to communicate at least one of registration, fault, and request information.

9. The health monitor subsystem of claim 8, wherein the request information is associated with an operational condition.

10. The health monitor subsystem of claim 8, wherein the request information is associated with a command operative to disable a component.

11. A method for monitoring conditions across a geographically disperse voice message system, comprising:

monitoring a first status condition responsive to a respective voice messaging system component operative on a host within the voice messaging system;

monitoring a second status condition responsive to the operation of a respective host within the voice messaging system;

monitoring a third status condition responsive to the operation of a respective platform;

providing a network accessible mechanism for discerning an operative health of one of the platform, the host, and the voice messaging system component in accordance with one or more the first status condition, the second status condition and the third status condition; and automatically responding to an undesired condition within a component process, wherein at least one response to the undesired condition comprises restarting the component process.

12. The method of claim 11, wherein monitoring a first status condition comprises periodically receiving information transmitted from the respective voice messaging system component.

13. The method of claim 11, wherein monitoring a first status condition comprises periodically polling the respective voice messaging system component for information.

14. The method of claim 11, wherein monitoring a first status condition comprises inserting an agent process in the respective voice messaging system component.

15. The method of claim 11, wherein monitoring a second status condition comprises inserting a manager process in the respective host.

16. The method of claim 11, wherein monitoring a third status condition comprises providing a common process operative within a computing device remote from a host that is coupled to the common process.

17. The method of claim 11, wherein knowledge of component dependencies is distributed across a plurality of hosts operative within the voice message system.

18. The method of claim 11, wherein responding comprises restarting the host.

19. The method of claim 11, wherein providing a network accessible mechanism comprises generating a graphical user interface that enables an operator to view the health of the voice messaging system on the platform, host, and component levels.

* * * * *

UNITED STATES PATENT AND TRADEMARK OFFICE
CERTIFICATE OF CORRECTION

PATENT NO. : 7,680,254 B2
APPLICATION NO. : 11/170532
DATED : March 16, 2010
INVENTOR(S) : Shafford R. Archer, Jr. et al.

Page 1 of 1

It is certified that error appears in the above-identified patent and that said Letters Patent is hereby corrected as shown below:

Column 1:
Line 22, immediately before "systems" please insert -- disclosed are --

Column 5:
Line 12, immediately after "modules" please insert -- 137 --

Column 7:
Line 1, immediately after "modules" please insert -- 137 --

Column 8:
Line 34, please replace "and or" with -- and/or --
Line 67, immediately after "occurred" please insert -- and --

Column 9:
Line 67, immediately after "of" please insert -- a --

Column 11:
Line 43, please replace "and or" with -- and/or --

Signed and Sealed this

Eleventh Day of May, 2010

David J. Kappos
*Director of the United States Patent and Trademark Office*